US009755451B2

(12) United States Patent
Butzmann (10) Patent No.: US 9,755,451 B2
(45) Date of Patent: Sep. 5, 2017

(54) BATTERY WITH AUTONOMOUS CELL BALANCING

(75) Inventor: Stefan Butzmann, Beilstein (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 505 days.

(21) Appl. No.: 13/978,322

(22) PCT Filed: Nov. 9, 2011

(86) PCT No.: PCT/EP2011/069729
§ 371 (c)(1),
(2), (4) Date: Oct. 11, 2013

(87) PCT Pub. No.: WO2012/092992
PCT Pub. Date: Jul. 12, 2012

(65) Prior Publication Data
US 2014/0035360 A1 Feb. 6, 2014

(30) Foreign Application Priority Data
Jan. 5, 2011 (DE) .................. 10 2011 002 452

(51) Int. Cl.
*H02J 1/00* (2006.01)
*H02J 7/00* (2006.01)
(Continued)

(52) U.S. Cl.
CPC ......... *H02J 7/0063* (2013.01); *H01M 10/425* (2013.01); *H01M 10/441* (2013.01)

(58) Field of Classification Search
CPC .................................................. H02J 7/0063
(Continued)

(56) References Cited

U.S. PATENT DOCUMENTS 5,479,083 A 12/1995 Brainard
2005/0077879 A1 4/2005 Near
(Continued)

FOREIGN PATENT DOCUMENTS

CN 1707903 A 12/2005
DE 44 22 409 A1 1/1996
(Continued)

OTHER PUBLICATIONS

The Electronics Handbook, Richard C. Dorf, Second Edition, 2005, Taylor & Francis Group.*
(Continued)

*Primary Examiner* — Robert Grant
*Assistant Examiner* — Harry O'Neil-Becerril
(74) *Attorney, Agent, or Firm* — Maginot, Moore & Beck LLP (57) ABSTRACT

The disclosure relates to a device for balancing the battery cells of a battery including a plurality of pairs of battery cells. Each pair of battery cells is connected to a charge balancing unit which is configured to balance the cell voltages of the battery cells of the pair of battery cells with respect to each other. The device further includes a measuring device which is configured to output a current that is proportional to a minimal cell pair voltage to a plurality of resistors that are connected in series. Comparators are also provided, each of which is connected to a pole of a first battery cell of an assigned pair of battery cells and to a respective resistor on an input side and to a control electrode of a respective discharging unit on an output side.

7 Claims, 6 Drawing Sheets

(51) Int. Cl.
*H01M 10/42* (2006.01)
*H01M 10/44* (2006.01)

(58) Field of Classification Search
USPC .......................................................... 320/119
See application file for complete search history.

(56) References Cited

U.S. PATENT DOCUMENTS

| | | | | |
|---|---|---|---|---|
| 2005/0269989 | A1* | 12/2005 | Geren | H02J 7/0016 320/119 |
| 2006/0082343 | A1* | 4/2006 | Sobue | H02J 7/0016 320/119 |
| 2007/0222422 | A1* | 9/2007 | Inoue | G05F 1/573 323/274 |
| 2009/0195079 | A1 | 8/2009 | Barrenscheen | |
| 2012/0021373 | A1* | 1/2012 | Moreno | A61B 1/015 433/31 |

FOREIGN PATENT DOCUMENTS

| | | |
|---|---|---|
| DE | 195 33 542 A1 | 3/1996 |
| DE | 695 12 576 T2 | 5/2000 |
| DE | 10 2006 022 394 A1 | 11/2007 |
| DE | 10 2007 035 329 A1 | 1/2009 |
| DE | 20 2009 007 226 U1 | 3/2010 |
| EP | 1 107 418 A2 | 6/2001 |
| EP | 1 603 212 A2 | 12/2005 |

OTHER PUBLICATIONS

International Search Report corresponding to PCT Application No. PCT/EP2011/069729, mailed Feb. 24, 2012 (German and English language document) (5 pages).

* cited by examiner

BATTERY WITH AUTONOMOUS CELL BALANCING

This application is a 35 U.S.C. §371 National Stage Application of PCT/EP2011/069729, filed on Nov. 9, 2011, which claims the benefit of priority to Serial No. DE 10 2011 002 452.2, filed on Jan. 5, 2011 in Germany, the disclosures of which are incorporated herein by reference in their entirety.

The present disclosure relates to a device for balancing (charge balancing) the battery cells of a battery comprising a plurality of battery cells connected in series, wherein, in accordance with the disclosure, control by means of a microcontroller is not necessary, that is to say the device can operate autonomously.

BACKGROUND

It has become apparent that battery systems will be increasingly used in the future, both in stationary applications and in vehicles, such as hybrid and electric vehicles. In order to meet the requirements of voltage and potentially available power specified for a respective application, a high number of battery cells are connected in series. Due to the series connection, the failure of one battery cell may lead to the failure of the battery and in turn to a failure of the entire system, wherefore high demands are placed on the reliability of the battery, in particular for safety-relevant applications. In order to detect the state of the battery and of the individual battery cells as accurately as possible and to thus identify a risk of failure of a battery cell in good time, the voltages of the battery cells in particular are measured regularly in addition to other parameters of the battery or battery cells. In the prior art, numerous methods are known to carry out what is known as cell balancing, that is to say to attempt to adapt the charge states of the various battery cells of a battery to one another, which has a positive effect on the service life of the battery. To this end, the battery is equipped with units that determine the cell voltages of the individual battery cells and also optionally further measurands, such as battery temperature and battery current, and transmit these to a central control unit (for example a microcontroller). The control unit calculates for each battery cell, from the transmitted measurement data, a respective charge state and generates the control signals necessary for carrying out the cell balancing process, said control signals causing the charge balancing among the battery cells in the battery, for example by partially discharging battery cells having a higher charge state. Here, the control unit is arranged outside the battery in order to take on further tasks. This entails the disadvantage however that relatively complex safety measures, such as insulators arranged in the data path, have to be taken in order to prevent, in the event of a fault, a short circuit between the high battery voltage (often several hundreds of volts in the case of battery-operated drive systems) and the parts, such as the control unit, which are arranged in the low-voltage network and can be contacted from the outside.

Figure 1:
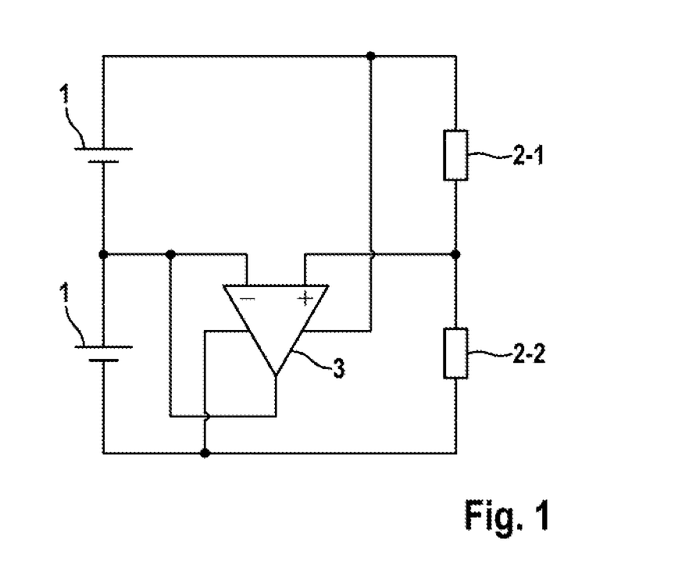
FIG. 1 shows a pair of battery cells with a charge balancing unit.

The present disclosure proposes a charge balancing unit which can adapt to one another the charge states of two battery cells connected in series and is illustrated in FIG. 1. To this end, a voltage divider is connected parallel to the two battery cells and halves the total voltage of the two battery cells connected in series and thus provides a reference voltage. This reference voltage is compared with the voltage at the connection point between the two battery cells connected in series, for which purpose a simple differential amplifier or comparator can be used. The output of the differential amplifier is connected to the connection point. The supply voltage connectors of the differential amplifier are connected to the highest and the lowest potential of the two battery cells.

If there is now a differential voltage at the inputs of the differential amplifier because the cells voltages of the two adjacent battery cells deviate from one another, such that the voltage of the connection point is not exactly equal to the reference voltage, the differential amplifier will output an output current having an appropriate sign, which counteracts the cause of the differential voltage, that is to say discharges the battery cell that has a higher cell voltage.

Figure 2:
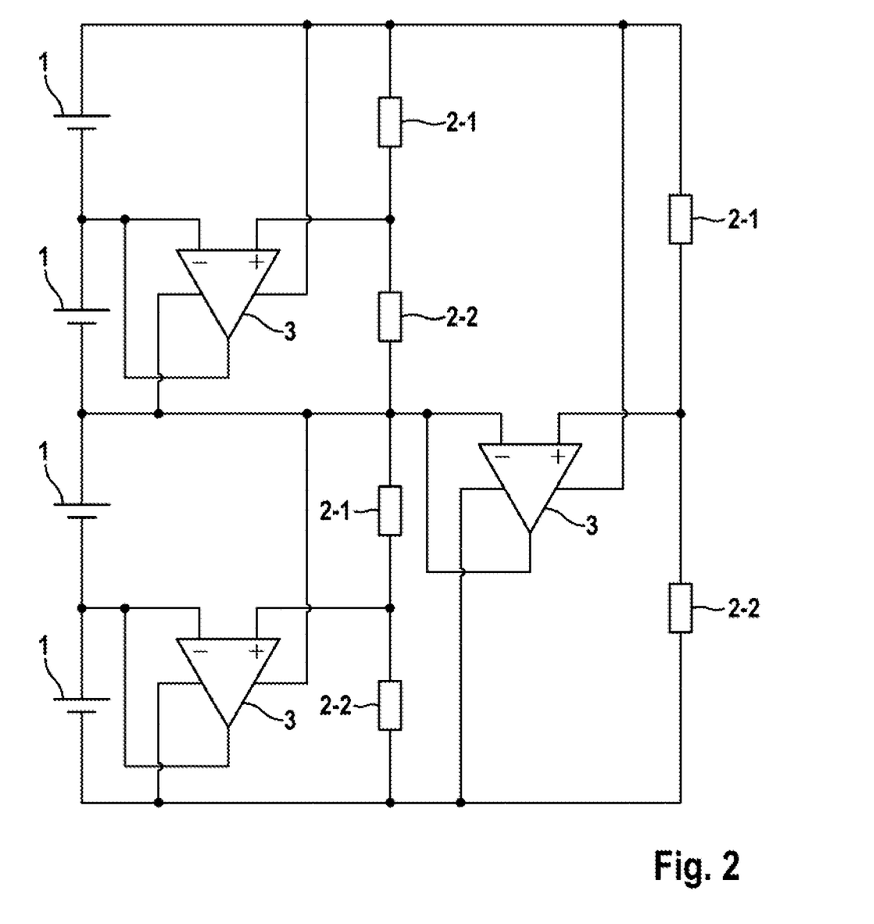
FIG. 2 shows a connection of two pairs of battery cells according to FIG. 1 with an additional charge balancing unit.

In addition, a possibility has been proposed to connect pairs of such charge balancing units, whereby any numbers 2^n of battery cells can be connected by recursive connection (FIG. 2). The limitation to powers of two is less desirable, however. In addition, the voltage dividers connected into the charge balancing units, of which increasingly more are provided in parallel with an increase in the number of battery cells, signify an undesirably high loading of the battery.

SUMMARY

In accordance with the disclosure, a device for balancing the battery cells of a battery having an even number n of battery cells connected in series is therefore introduced. Here, the even number n is at least 4 and the n battery cells divide into n/2 pairs of adjacent battery cells. The device comprises a plurality of charge balancing units, each connected or connectable to an allocated pair of the pairs of adjacent battery cells, and a measuring device connected to the charge balancing units. The charge balancing units are designed to adapt to one another the cell voltages of the battery cells of the allocated pair of adjacent battery cells. The measuring device is designed to generate a current proportional to a minimum cell pair voltage of all cell pair voltages of the pairs of battery cells and to output said current to a number n/2 of resistors connected in series. In addition, a number n/2 of first comparators is provided, which each have a first input connected to the first or to the second pole of the first battery cell of an allocated pair of battery cells, a second input connected to a second of the respective adjacent resistors, and an output connected to a control electrode of a respective discharge unit, and are designed to compare a first voltage applied to the first input with a second voltage applied to the second input and to output a control signal dependent on a result of the comparison. The discharge units are each connected parallel to an allocated pair of battery cells and are designed, depending on the control signal, to allow a discharge current to flow from the respective pair of battery cells.

The disclosure has the advantage that any even number of battery cells of a battery can be balanced in a fully self-sufficient manner, that is to say it is possible to dispense with a control by means of a control unit arranged outside the battery. To this end, merely a simple electronic circuit is necessary, which determines a minimum cell pair voltage of all pairs of battery cells and compares the cell pair voltages of the individual pairs of battery cells with this minimum cell voltage. If the cell pair voltage of a given pair of battery cells is higher than the minimum cell pair voltage, the pair of battery cells is discharged by the allocated discharge unit. Here, the charge states of each pair of battery cells are adapted to one another, as explained with reference to FIG. 1.

In accordance with the disclosure, complex measures for insulating the batteries with respect to the low-voltage network, in which a control unit for controlling the cell balancing process is usually arranged, can thus be omitted.

Each charge balancing unit preferably contains a voltage divider connected or connectable to a first pole of a first battery cell of a pair of battery cells allocated to the respective charge balancing unit and connected or connectable to a second pole of a second battery cell of the allocated pair of battery cells, and a second comparator. Here, the second comparator has a first input connected to a centre tap of the voltage divider, a second input connected or connectable to a second pole of the first battery cell and to a first pole of the second battery cell, and an output connected to the second input, and is designed to output an output current dependent on a voltage difference between a second voltage at the first input and a third voltage at the second input. The voltage divider is designed to output at its centre tap a partial voltage that corresponds to half a cell pair voltage between the first pole of the first battery cell and the second pole of the second battery cell of the pair of battery cells.

Such a charge balancing unit can be constructed easily and makes it possible to continuously adapt to one another the charge states of the two battery cells connected to the charge balancing unit, such that the two battery cells also age in equal measure.

The device may have a number (n/2−1) of potential replication means, which are each connected between two adjacent resistors of the plurality of resistors and are designed to replicate a potential at a first pole of a first or second battery cell of a pair of battery cells allocated to the respective potential replication means and to output said potential to a first of the respective two adjacent resistors.

The potential replication means make it possible to conduct through a resistor connected to the potential replication means the output current output by the measuring device at a defined potential predetermined by the potential to be replicated by the potential replication means. The voltage falling across the respective resistor, said voltage corresponding to the minimum cell pair voltage, can thus be compared easily with the cell pair voltage of the respective pair of battery cells.

The potential replication means may each comprise, for example, a differential amplifier and an npn transistor, wherein the base of the npn transistor is connected to the output of the differential amplifier, and the emitter of the npn transistor is connected to the inverting input of the differential amplifier. The current proportional to the minimum cell pair voltage then flows from the collector of the npn transistor to the emitter thereof, whereas the feedback of the emitter voltage to the inverting input of the differential amplifier ensures that the potential at the emitter of the npn transistor is equal to the greatest possible extent to that at the non-inverting input of the differential amplifier.

Alternatively, the potential replication means may each comprise a pnp transistor and an npn transistor, wherein a base of the pnp transistor is connected to the first pole of the allocated battery cell, an emitter of the pnp transistor is connected to a base of the npn transistor, and an emitter of the npn transistor is connected to the first of the respective two adjacent resistors. This embodiment of the potential replication means has the advantage that the potential at the base of the pnp transistor is reproduced very accurately at the emitter of the npn transistor because the base-emitter voltages of the two transistors cancel one another out. Here, it is additionally advantageous for the temperature behavior of the base-emitter voltages of the two transistors to be identical or at least very similar over broad temperature ranges, such that the mutual compensation of the base-emitter voltages functions independently of temperature.

The discharge units preferably contain a current-limiting resistor and a switch, wherein the switch is designed to allow the discharge current to flow at a first logical level of the control signal and to suppress a current flow at a second logical level of the control signal. In addition, the current-limiting resistor is designed to limit the discharge current. This embodiment of the discharge units is particularly easy to implement. In addition, it has the advantage that, due to the constant current-limiting resistor, the discharge current is dependent on the cell pair voltage and the discharge current when balancing a pair of battery cells already relatively largely discharged is therefore lower than in the case of a pair of battery cells still relatively highly charged. In principle however, each connectable current source, which is designed to allow the discharge current to flow at a first logical level of the control signal and to suppress a current flow at a second logical level of the control signal, can be used as a discharge unit.

The plurality of resistors connected in series preferably each have a resistance value that corresponds to a quotient of the minimum cell pair voltage of all cell pair voltages of the pairs of battery cells and of the current proportional to the minimum cell pair voltage of all cell pair voltages of the pairs of battery cells.

The measuring device may have a number n/2 of differential amplifiers, wherein each of the differential amplifiers comprises a pair of transistors, of which the emitters or sources are connected to one another and to an input for a current source, and of which the control electrodes are each connected to a respective one of two signal inputs of the differential amplifier.

Here, the input for the current source of a first of the differential amplifiers is preferably connected to a current source, and the collector or the drain of one of the transistors of the pair of transistors is preferably connected to the input for the current source of a further of the differential amplifiers, such that the differential amplifiers are cascaded. This cascading of differential amplifiers has the advantage that each of the differential amplifiers acts as a current source for the differential amplifier arranged thereabove. Due to the operating principle of a differential amplifier with two branches, the current flows only in one branch of the differential amplifier however, depending on the voltages applied to the inputs of the differential amplifier. A current can therefore flow through all differential amplifiers and therefore through the measuring device only if the voltage at both inputs is identical or the voltage across the respective pair of battery cells or across a selected battery cell of the pair of battery cells is greater than the voltage across the resistor connected to the other input of the respective differential amplifier. A control system is thus produced that sets the current at the output of the measuring device accurately, such that it is proportional to the minimum cell pair voltage of all cell pair voltages.

A second aspect of the disclosure introduces a battery having an even plurality, larger than or equal to 4, of battery cells connected in series and a device, according to the first aspect of the disclosure, connected to the battery cells.

Here, the battery cells are preferably lithium-ion battery cells.

A third aspect of the disclosure concerns a motor vehicle having an electric drive motor for driving the motor vehicle and a battery, according to the above aspect of the disclosure, connected to the electric drive motor.

BRIEF DESCRIPTION OF THE DRAWINGS

Exemplary embodiments of the disclosure will be explained in greater detail on the basis of the drawings and the following description, wherein like reference signs denote like or functionally equivalent components. In the drawings.

DETAILED DESCRIPTION

Figure 3:
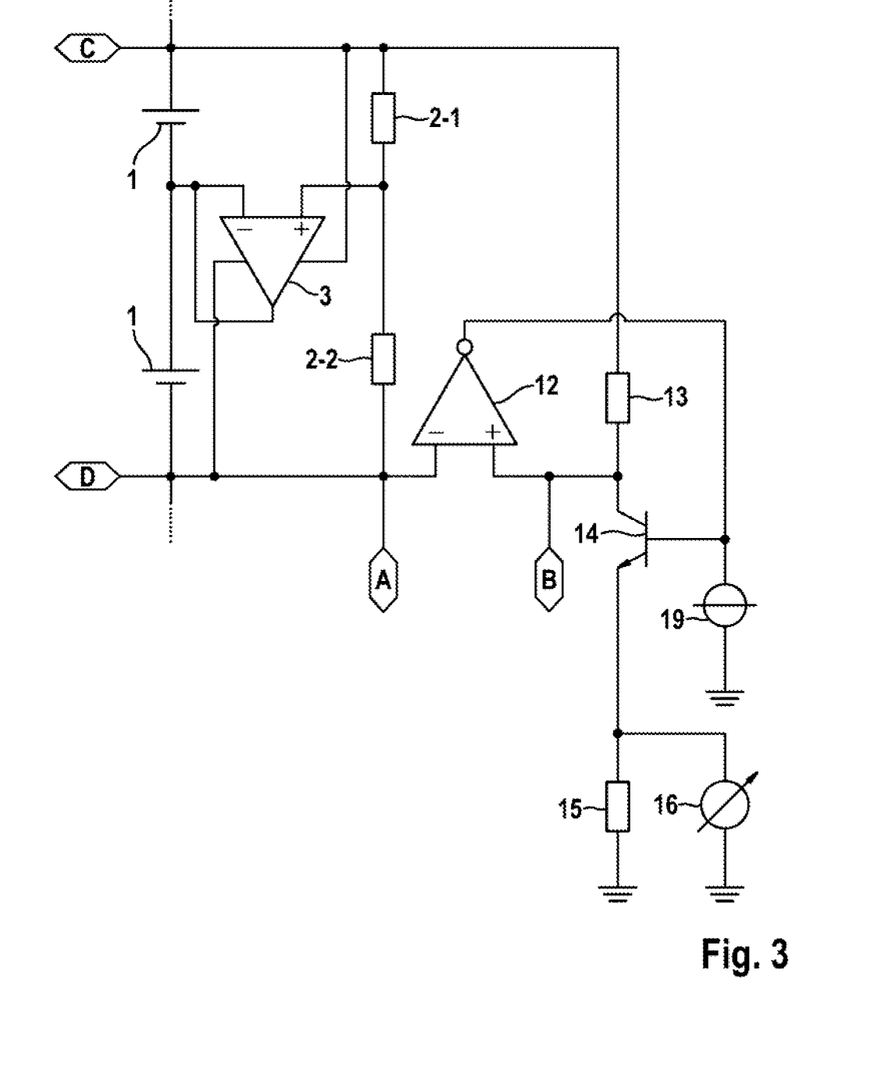
FIG. 3 shows a first exemplary embodiment of a measuring device for use within the scope of the disclosure.
Figure 4:
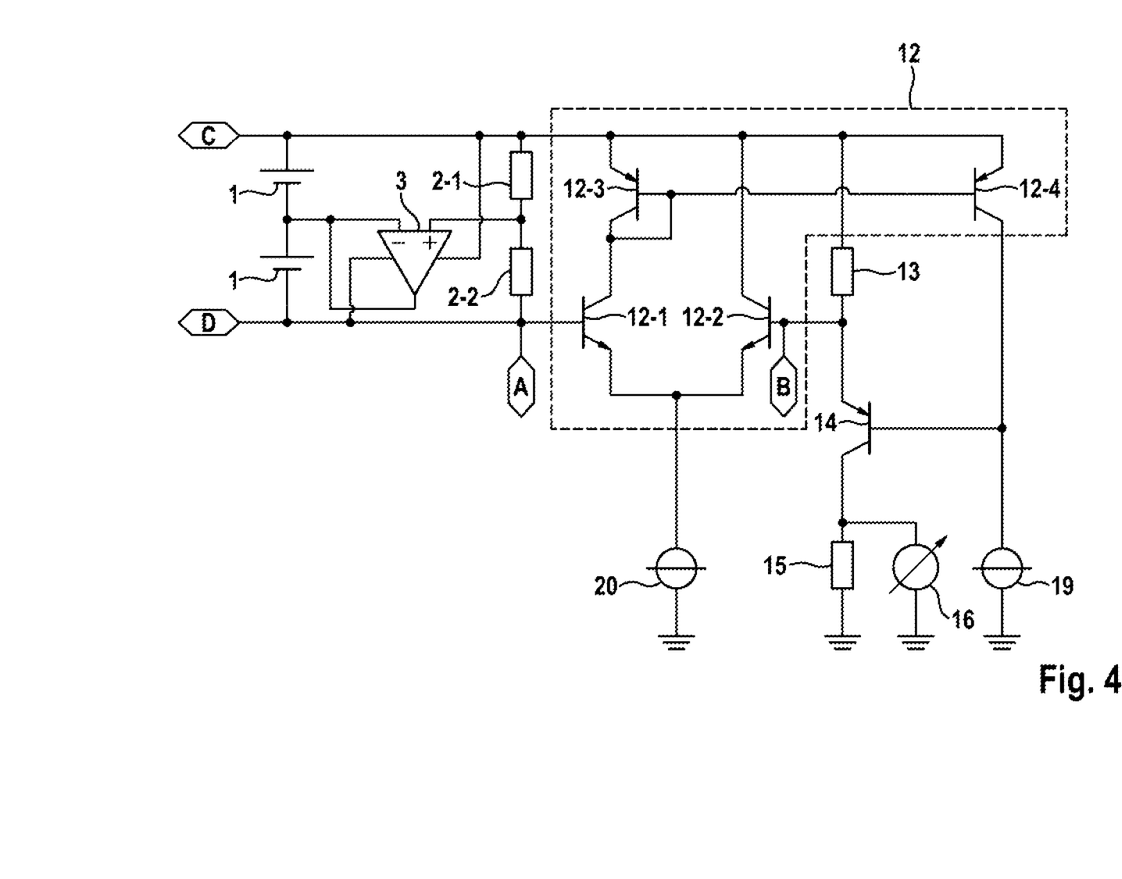
FIG. 4 shows a second exemplary embodiment of a measuring device for use within the scope of the disclosure.
Figure 5:
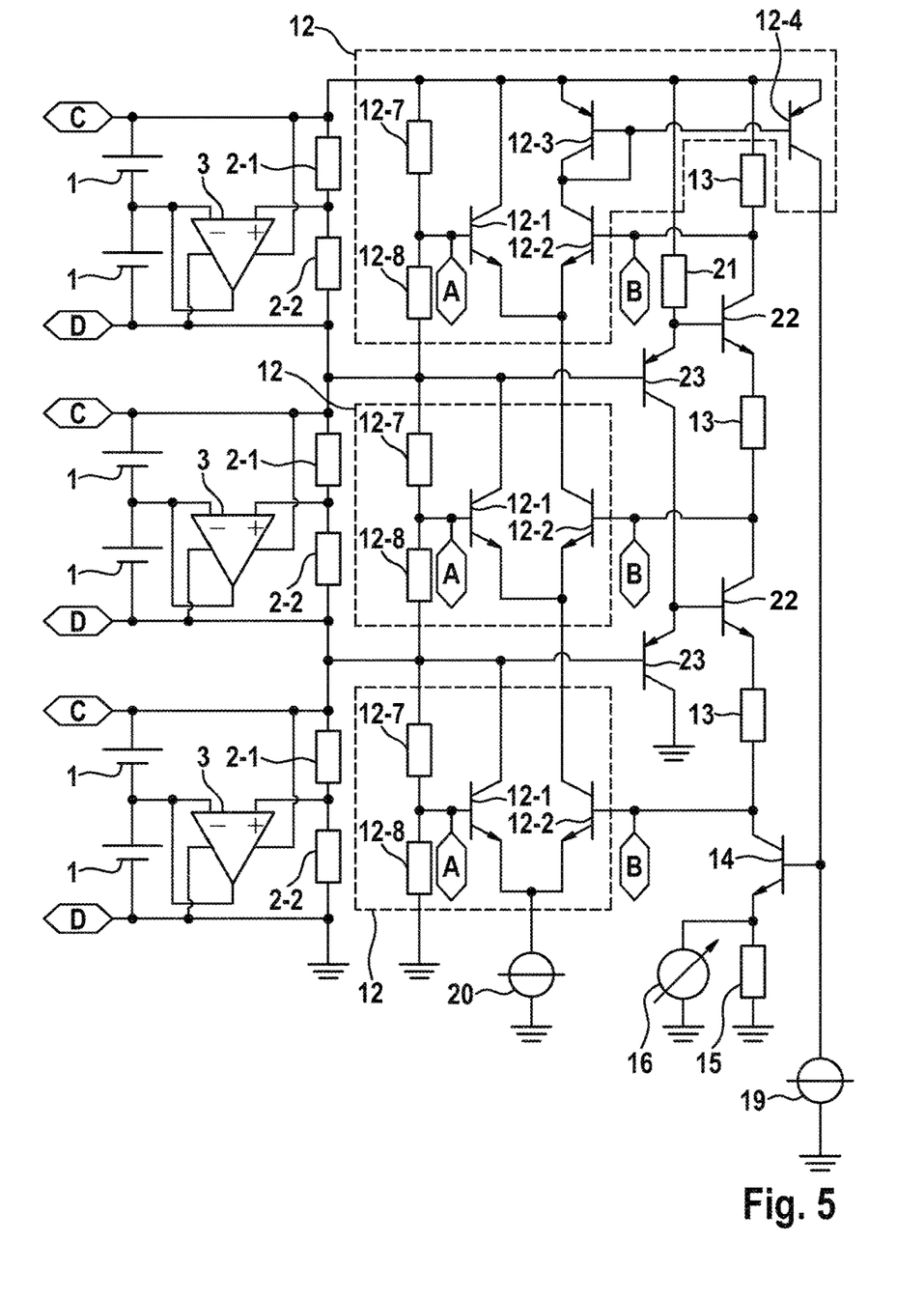
FIG. 5 shows a third exemplary embodiment of a measuring device for use within the scope of the disclosure.
Figure 6:
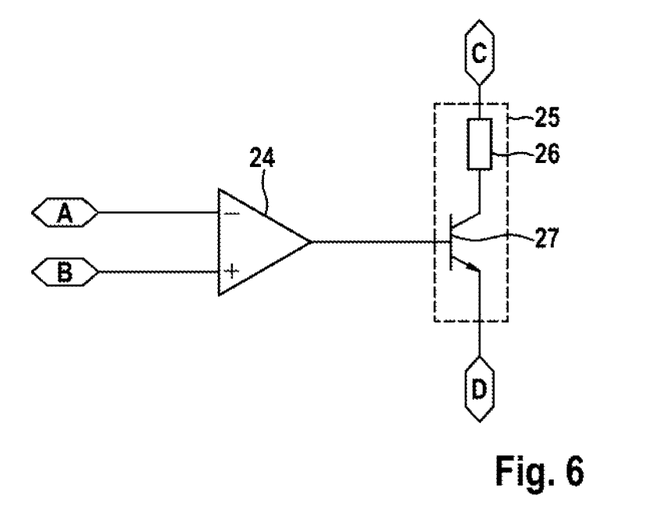
FIG. 6 shows an exemplary embodiment of a second comparator according to the disclosure and a discharge unit for use within the scope of the disclosure.

FIG. 3 shows a first exemplary embodiment of a measuring device for use within the scope of the disclosure. FIGS. 3 and 4 serve to explain the operating principle of a measuring device for use within the scope of the disclosure. FIG. 5 shows a possible implementation of a measuring device for use with a plurality of pairs of battery cells. In FIGS. 3 to 5, connection points A, B, C and D are marked, to which further circuit elements are to be connected in accordance with the disclosure, for which an example is shown in FIG. 6. In FIG. 6, the connections to be allocated to the connections points A, B, C and D are each denoted by use of identical markers.

A first pole of one of the battery cells 1 of a pair of battery cells 1, which is connected in series to further pairs of battery cells to form a string, is connected to one of two inputs of a transimpedance amplifier 12. The second input of the transimpedance amplifier 12 is connected to a connection of a resistor 13, of which the further connection is in turn connected to a pole of one of the battery cells 1 of the pair of battery cells. In the example shown, the resistor 13 is connected to a second pole of the remaining battery cell of the pair of battery cells such that, in the steady state, the voltage across the resistor 13 corresponds to the cell pair voltage of the pair of battery cells 1. It is also possible however to connect the resistor 13 to the connection point of the two battery cells 1 of the pair of battery cells. In this case, the voltage across the resistor 13 in the steady state would also correspond only to the cell voltage of the lower battery cell 1 of the pair of battery cells, which is kept equal however by means of the charge balancing unit 3, as explained in conjunction with FIG. 1, to the cell voltage of the upper battery cell 1 of the pair of battery cells. It is also true for all further embodiments of the disclosure that the resistors 13 can each be connected to the connection point of a pair of battery cells 1 (where appropriate via a potential replication device).

The output of the transimpedance amplifier 12 is connected to a control electrode of a flow control valve 14, which in the shown example is formed as an npn transistor. Other transistor types or more complex circuits than the flow control valve 14 can also be used, however. The flow control valve is connected between the connection of the resistor 13 connected to the transimpedance amplifier 12 and the actual voltage measuring device, which is only shown by way of example in all exemplary embodiments. This voltage measuring device may comprise a reference resistor 15 with a known resistance value and a voltmeter 16, which measures the voltage falling across the reference resistor 15.

The transimpedance amplifier 12 compares the cell pair voltage of the pair of battery cells 1 to the voltage falling across the resistor 13 and generates an output current, of which the size is proportional to the difference between the two voltages. This output current reaches the control electrode of the flow control valve 14, to which an optional target current source 19 can be connected. This target current source 19 guides a constant current and serves to adjust the working point of the flow control valve 14. The output current of the transimpedance amplifier 12, where appropriate less the constant current of the target current source 19, controls the current allowed to pass by the flow control valve 14. The more current allowed to pass by the flow control valve 14, the greater however is the voltage that falls across the resistor 13. This means that the voltage at an input of the transimpedance amplifier 12 rises relative to the voltage at the other input thereof, whereby the difference between the input voltages decreases and the transimpedance amplifier 12 also reduces its output current accordingly. If, however, too little current flows across the resistor 13, the transimpedance amplifier 12 will again allow more current to flow at the control electrode of the flow control valve 14 accordingly.

A feedback is thus produced that causes the voltage across the resistor 13 to be kept identical to the cell pair voltage due to the control effect of the control cell comprising the transimpedance amplifier 12, the resistor 13, and the flow control valve 14. Since the inputs of the transimpedance amplifier 12 are ideally highly resistive, the total current that flows through the resistor 13 also flows through the flow control valve 14 and, due to the linear relationship between voltage, resistance and current, constitutes an exact measure for the cell pair voltage. It could now be measured at another location if there is interest in its actual value, for example by being guided via a reference resistor 15, itself not belonging to the measuring device, and thus by being converted into a voltage, of which the magnitude is given directly from the cell pair voltage and can be measured at its location independently of the usually high and variable potentials at the battery poles of the battery cells 1 and therefore safely. In this case, a correction factor may also be taken into consideration where appropriate and specifies the ratio of the value of the resistor 13 to that of the reference resistor 15. In order to avoid a falsification of the current output by the flow control valve 14 by means of the base current of the flow control valve 14 formed in the shown example as a bipolar transistor, a MOSFET or an IGBT (insulated gate bipolar transistor) can be used, for example.

FIG. 4 shows a second exemplary embodiment of a measuring device for use within the scope of the disclosure, in which the transimpedance amplifier 12 is formed as a differential amplifier. The transimpedance amplifier 12 has a connection for a current source 20, which impresses a current into the differential amplifier. Depending on which of the two transistors 12-1 and 12-2 of the two branches of the differential amplifier receives the greater input voltage, the current of the current source 20 will flow by the majority either through one transistor or the other. The current flowing through the transistor 12-1 is reflected via a current mirror, which comprises the transistors 12-3 and 12-4, and is output. Since the operating principle of a differential amplifier is well known in the prior art, it will not be discussed in greater detail here.

In contrast to the exemplary embodiment of FIG. 3, the flow control valve 14 is formed here as a pnp transistor, whereby a lower output current of the transimpedance amplifier 12, output by the transistor 12-4, leads to a drop of the voltage at the control electrode of the flow control valve 14 and thus to an increase of the base-emitter voltage of the flow control valve formed as a pnp transistor. The increased base-emitter voltage in turn causes a rise of the current through the flow control valve 14, which again results in the desired feedback. The flow control valve 14 could also be formed as an npn transistor, however. In this case, the transistor 12-3 could be connected easily into the other branch of the differential amplifier (between the positive pole of the battery cell 1 and the transistor 12-2). Of course, MOS transistors of appropriate polarity could also be used again here for example instead of bipolar transistors.

The current source 19 preferably guides a current which corresponds to half the current of the current source 20. In the steady state of the control cell, the current of the current source 20 is ideally divided in equal parts over the two branches of the differential amplifier. In this case, the transistor 12-14 will also output a current that corresponds to half the current of the current source 20, such that the voltage at the control electrode of the flow control valve 14 remains constant. Instead of the current source 19, a single resistor or other suitable switching means could also be used for example, however.

FIG. 5 shows a third exemplary embodiment of a measuring device for use within the scope of the disclosure. In this exemplary embodiment, a plurality of control cells are constructed and cascaded. Here, each control cell is connected to a pair of battery cells 1, wherein this pair of battery cells 1 in turn has an allocated charge balancing unit. The transimpedance amplifiers 12 are also constructed in the example of FIG. 5 as differential amplifiers, wherein the current flowing through a branch of a respective differential amplifier serves however as a current source for the superordinate differential amplifier. Only the lowermost differential amplifier is connected directly to a current source 20, which for example can be constructed jointly with the current source 19 as a current mirror. However, other embodiments of the current sources 19 and 20 are of course also possible.

Apart from the transimpedance amplifiers 12, the resistors 13 are also cascaded. Since the cascade of transimpedance amplifiers outputs just a single output current however, only one flow control valve 14 is also provided and may be implemented as a transistor.

In order to adapt the potential above each of the resistors 13 to that of the connection point of the respective allocated pair of battery cells 1 without influencing the current flow through the resistors 13, a potential replication means is additionally provided with the lower control cells and for example may comprise a pair of complementary transistors 22 and 23. In order to limit here the current through the cascaded transistors 23, a resistor 21 is additionally preferably provided. Instead of the transistors 22 and 23 and also the resistor 21, other circuits can also be provided however which adapt the potential at the resistors 13 to that at the contact point to the pair of battery cells 1.

The input of the differential amplifier connected to the battery cells 1 may have a voltage divider formed from resistors 12-7 and 12-8, since otherwise a sufficiently high potential for the uppermost differential amplifier would no longer be available at the collectors or a sufficiently high potential for the lowermost differential amplifier would no longer be available at the emitters of the transistors 12-1 and 12-2. In this case, just one voltage divider is preferably used however, that is to say the voltage divider formed from the resistors 12-7 and 12-8 can be omitted and the base of the transistor 12-1 is connected to the connection point of the resistors 2-1 and 2-2 of the charge balancing unit of the allocated pair of battery cells 1.

The measuring device of FIG. 5 has the specific property that the cell pair voltages of a number of pairs of battery cells 1 can be measured simultaneously, wherein only the minimum cell pair voltage of all pairs of battery cells 1 is measured, however. This means that the current output by the cascade of differential amplifiers in the exemplary embodiment of FIG. 5 is proportional to the smallest of all cell pair voltages. The measuring device of FIG. 5 can of course also be formed here for just two pairs of battery cells 1 or a greater number of pairs of battery cells 1.

In accordance with the disclosure, the minimum cell pair voltage of all pairs of battery cells 1 is determined in order to compare the cell pair voltages of the further pairs of battery cells 1 to the minimum cell pair voltage and, in the event of a sufficiently large deviation, to selectively reduce the cell pair voltages of the further pairs of battery cells 1. Due to this cell balancing, which is carried out here simultaneously in each case for a pair of battery cells, however, the charge states of all pairs of battery cells are adapted to one another, which has a positive effect on the service life of the battery. Here, the respective charge balancing unit allocated to each pair of battery cells in turn adapts to one another the cell voltages of the two battery cells connected in series to form a pair. Since the disclosure provides a simple means for determining the minimum cell pair voltage and also means for comparing the voltage and for discharging the pairs of battery cells, a device for cell balancing can be produced, which can function in a fully self-sufficient manner within the battery and without inclusion of complex components, such as microcontrollers and the like.

FIG. 6 shows an exemplary embodiment of a first comparator 24 according to the disclosure and a discharge unit 25 for use within the scope of the disclosure. The first comparator 24 is preferably formed as a usual differential amplifier, for example as an operational amplifier, which generates an output voltage which is proportional to a voltage difference existing between its two inputs. Due to the high amplification of the differential amplifier, even low voltage differences lead to a saturation of the output voltage of the differential amplifier, such that this output voltage can be considered a binary control signal. This control signal is output to a control input of a discharge unit 25, which discharges in accordance with the logical level of the control signal of a pair of battery cells connected to the discharge unit 25 or suppresses a current flow through the discharge unit 25 between the connection points C and D. The discharge unit 25 preferably comprises a switching transistor 27, which can be formed for example as a bipolar transistor or as a field-effect transistor. The switching transistor 27 is in this case connected directly by the control signal generated by the first comparator 24. In order to limit the current flow through the discharge unit 25 when the pair of battery cells is discharged, a current-limiting resistor 26 is preferably provided.

In an improved variant of the circuit of FIG. 6, one of the inputs of the first comparator 24 may be connected via a voltage source to the allocated connection point. The voltage source generates an offset voltage, which changes the voltage at the input of the first comparator 24 accordingly. The first comparator 24 will thus generate the logical level of the control signal, taking into account the offset voltage. This means that a battery cell connected to the first comparator 24 and the discharge unit 25 is then only discharged if the cell voltage of the battery cell is greater than the minimum cell voltage by at least the offset voltage, whereby faulty discharging caused by interfering effects, such as noise, load steps or other dynamic influences, can be avoided.

The invention claimed is:

1. A device for balancing a plurality of battery cells of a battery comprising:
   an even number of n battery cells in a plurality of battery cells connected in series, wherein n is at least 4 and the n battery cells divide into n/2 pairs of adjacent battery cells;
   a plurality of charge balancing units, each charge balancing unit further comprising:
   a first battery cell in one pair of the n/2 pairs of adjacent battery cells;
   a second battery cell in the one pair of the n/2 pairs of adjacent, the second battery cell being connected in series with the first battery cell;
   a first resistor connected in series with a second resistor, the first resistor and second resistor being connected in parallel with the first battery cell and second battery cell;
   a differential amplifier having a first input connected between the first battery cell and the second battery cell, a second input connected between the first resistor and the second resistor, and an output connected between the first battery cell and the second battery cell; and
   a measuring device connected to the plurality of charge balancing units, the measuring device comprising:
   a first current source connected to a flow control valve to enable the measuring device to generate a current proportional to a minimum cell pair voltage of all cell pair voltages of the pairs of battery cells; and
   a plurality of resistors connected between the flow control valve and the first resistor in one charge balancing unit in the plurality of charge balancing units, each resistor in the plurality of resistors corresponding to one of the n/2 number of pairs of adjacent battery cells, the first current source being configured to output the current to each resistor in the plurality of resistors; and
   a number n/2 of first comparators, each of the first comparators including:
   a first input connected to a first pole of the first battery cell in one of the plurality of charge balancing units and a second pole of a second battery cell of another of the plurality of charge balancing units;
   a second input connected between two resistors in the plurality of resistors; and
   an output, each comparator being configured to compare a first voltage applied to the first input with a second voltage applied to the second input and to output a control signal dependent on a result of the comparison, wherein the output of one of the first comparators is connected to the first current source; and
   a plurality of discharge units, each discharge unit in the plurality of discharge units being connected in parallel to one pair of battery cells in the n/2 pairs of adjacent battery cells, each discharge unit further comprising:
   another comparator having a first input and a second input connected to the first input and the second input, respectively, of the first comparator in the plurality of first comparators corresponding to the discharge unit; and
   a current-limiting resistor connected in series to a switching device and the current-limiting resistor and switching device being connected in parallel to the first battery cell and the second battery cell in the one pair of battery cells, the switching device being configured to connect the current-limiting resistor to the second battery cell to complete a circuit between the first battery cell and the second battery cell in response to the control signal from the output of the comparator that is generated in response to a first voltage level present at the first input of the other comparator being greater than a second voltage level present at the second input of the other comparator, the second voltage level being a minimum voltage level for any pair of battery cells in the n/2 pairs of battery cells.

2. The device according to claim 1, at least one charge balancing unit in the plurality of charge balancing units further comprising:
   a voltage divider connected or connectable to a first pole of the first battery cell and connected or connectable to a second pole of the second battery cell the other comparator in the charge balancing unit including a first input connected to a center tap of the voltage divider, a second input connected or connectable to a second pole of the first battery cell and to a first pole of the second battery cell, and an output connected to the second input, and is configured to output an output current dependent on a voltage difference between a second voltage at the first input and a third voltage at the second input, and
   the voltage divider being configured to output a partial voltage that corresponds to half a cell pair voltage between the first pole of the first battery cell and the second pole of the second battery cell of the pair of battery cells at the center tap.

3. The device according to claim 1, further comprising:
   a potential replication device comprising a plurality of circuits with a plurality of outputs, each output being connected to the second input of the other comparator in one discharge unit of the plurality of discharge units, each circuit comprising:
   a first transistor;
   a second transistor;
   a resistor connected to the output, the first transistor including a collector connected to the resistor and an emitter connected to another resistor in another one of the plurality of circuits, the second transistor including a collector connected to an emitter in another second transistor in another one of the plurality of circuits, a base connected between two charge balancing units in the plurality of charge balancing units, and an emitter connected to a base of the first transistor; and
   each circuit in the plurality of circuits being configured to generate a voltage output signal at the output connected to the resistor at a voltage level of a minimum voltage level of any pair of battery cells in the n/2 pairs of battery cells.

4. The device according to claim 1, wherein:
   the measuring device includes a number n/2 of differential amplifiers, and
   each of the differential amplifiers includes a pair of transistors, of which emitters of the plurality of transistors or sources of the plurality of transistors are connected to one another and to an input for a second current source, and of which control electrodes of the plurality of transistors are each connected to a respective one of two signal inputs of the differential amplifier.

5. The device according to claim 4, wherein the input for the current source of a first of the differential amplifiers is connected to the second current source, and the collector or the drain of one of the transistors of the pair of transistors is connected to the input for the current source of a further of the differential amplifiers, such that the differential amplifiers are cascaded.

6. A battery comprising:
a plurality of battery cells connected in series, the plurality of battery cells including an even number n of the battery cells connected in series, n is at least 4, and the n battery cells divide into n/2 pairs of adjacent battery cells; and
a charge balancing device connected to the plurality of battery cells, the charge balancing device comprising:
a plurality of charge balancing units, each charge balancing unit further comprising:
a first battery cell in one pair of the n/2 pairs of adjacent battery cells;
a second battery cell in the one pair of the n/2 pairs of adjacent, the second battery cell being connected in series with the first battery cell;
a first resistor connected in series with a second resistor, the first resistor and second resistor being connected in parallel with the first battery cell and second battery cell;
a differential amplifier having a first input connected between the first battery cell and the second battery cell, a second input connected between the first resistor and the second resistor, and an output connected between the first battery cell and the second battery cell;
a measuring device connected to the plurality of charge balancing units, the measuring device comprising:
a current source connected to a flow control valve to enable the measuring device to generate a current proportional to a minimum cell pair voltage of all cell pair voltages of the pairs of battery cells; and
a plurality of resistors connected between the flow control valve and the first resistor in one charge balancing unit in the plurality of charge balancing units, each resistor in the plurality of resistors corresponding to one of the n/2 number of pairs of adjacent battery cells, the current source being configured to output the current to each resistor in the plurality of resistors; and
a number n/2 of first comparators, each of the first comparators including:
a first input connected to a first pole of the first battery cell in one of the plurality of charge balancing units and a second pole of a second battery cell of another of the plurality of charge balancing units;
a second input connected between two resistors in the plurality of resistors; and
an output, each comparator being configured to compare a first voltage applied to the first input with a second voltage applied to the second input and to output a control signal dependent on a result of the comparison, wherein the output of one of the first comparators is connected to the current source; and
a plurality of discharge units, each discharge unit in the plurality of discharge units being connected in parallel to one pair of battery cells in the n/2 pairs of adjacent battery cells, each discharge unit further comprising:

another comparator having a first input and a second input connected to the first input and the second input, respectively, of the first comparator in the plurality of first comparators corresponding to the discharge unit; and
a current-limiting resistor connected in series to a switching device and the current-limiting resistor and switching device being connected in parallel to the first battery cell and the second battery cell in the one pair of battery cells, the switching device being configured to connect the current-limiting resistor to the second battery cell to complete a circuit between the first battery cell and the second battery cell in response to the control signal from the output of the comparator that is generated in response to a first voltage level present at the first input of the other comparator being greater than a second voltage level present at the second input of the other comparator, the second voltage level being a minimum voltage level for any pair of battery cells in the n/2 pairs of battery cells.

7. A motor vehicle comprising:
an electric drive motor configured to drive the motor vehicle; and
a battery connected to the electric drive motor, the battery including a plurality of battery cells connected in series, the plurality of battery cells including an even number n of the battery cells connected in series, n is at least 4, and the n battery cells divide into n/2 pairs of adjacent battery cells; and
a charge balancing device connected to the plurality of battery cells, the charge balancing device comprising:
a plurality of charge balancing units, each charge balancing unit further comprising:
a first battery cell in one pair of the n/2 pairs of adjacent battery cells;
a second battery cell in the one pair of the n/2 pairs of adjacent, the second battery cell being connected in series with the first battery cell;
a first resistor connected in series with a second resistor, the first resistor and second resistor being connected in parallel with the first battery cell and second battery cell;
a differential amplifier having a first input connected between the first battery cell and the second battery cell, a second input connected between the first resistor and the second resistor, and an output connected between the first battery cell and the second battery cell;
a measuring device connected to the plurality of charge balancing units, the measuring device comprising:
a current source connected to a flow control valve to enable the measuring device to generate a current proportional to a minimum cell pair voltage of all cell pair voltages of the pairs of battery cells; and
a plurality of resistors connected between the flow control valve and the first resistor in one charge balancing unit in the plurality of charge balancing units, each resistor in the plurality of resistors corresponding to one of the n/2 number of pairs of adjacent battery cells, the current source being configured to output the current to each resistor in the plurality of resistors; and
a number n/2 of first comparators, each of the first comparators including:
a first input connected to a first pole of the first battery cell in one of the plurality of charge balancing units and a second pole of a second battery cell of another of the plurality of charge balancing units;

a second input connected between two resistors in the plurality of resistors; and an output, each comparator being configured to compare a first voltage applied to the first input with a second voltage applied to the second input and to output a control signal dependent on a result of the comparison, wherein the output of one of the first comparators is connected to the current source; and a plurality of discharge units, each discharge unit in the plurality of discharge units being connected in parallel to one pair of battery cells in the n/2 pairs of adjacent battery cells, each discharge unit further comprising:

another comparator having a first input and a second input connected to the first input and the second input, respectively, of the first comparator in the plurality of first comparators corresponding to the discharge unit; and a current-limiting resistor connected in series to a switching device and the current-limiting resistor and switching device being connected in parallel to the first battery cell and the second battery cell in the one pair of battery cells, the switching device being configured to connect the current-limiting resistor to the second battery cell to complete a circuit between the first battery cell and the second battery cell in response to the control signal from the output of the comparator that is generated in response to a first voltage level present at the first input of the other comparator being greater than a second voltage level present at the second input of the other comparator, the second voltage level being a minimum voltage level for any pair of battery cells in the n/2 pairs of battery cells.

* * * * *